June 29, 1965   R. H. WENTORF, JR   3,192,015
GROWTH OF LARGE CUBIC FORM OF BORON NITRIDE CRYSTALS
Filed April 1, 1963
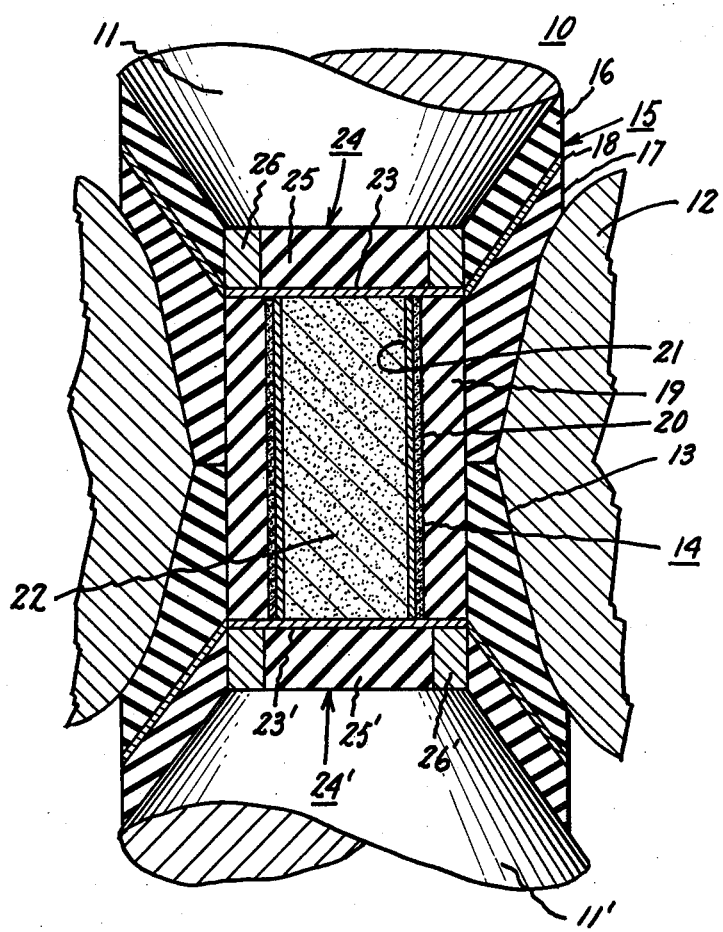
Inventor:
Robert H. Wentorf Jr.,
by James J. Lichiello
His Attorney.

United States Patent Office 3,192,015
Patented June 29, 1965

3,192,015
GROWTH OF LARGE CUBIC FORM OF BORON
NITRIDE CRYSTALS
Robert H. Wentorf, Jr., Schenectady, N.Y., assignor to
General Electric Company, a corporation of New York
Filed Apr. 1, 1963, Ser. No. 269,410
5 Claims. (Cl. 23—191)

This invention relates to the growth of cubic form of boron nitride crystals and more particularly to a multiple growth method utilized to grow larger single crystals of cubic form of boron nitride.

In addition to the many uses of the cubic form of boron nitride crystals in smaller mesh sizes for various cutting and grinding operations, there are also a great number of diverse applications which may utilize larger cubic boron nitride crystals; for example, on the order of $\frac{1}{10}$ to $\frac{1}{2}$ carat size. The availability of these crystals in their larger sizes, and at an economical price, leads to increasing application and demand in industrial trades. However, at the present time, cubic form of boron nitride crystals are not presently commerically available or feasible in the larger sizes.

Accordingly, it is an object of this invention to provide larger cubic boron nitride crystals from a growth process.

It is another object of this invention to provide an improved method of growing large cubic boron nitride crystals.

It is another object of this invention to provide multiple growth features to provide larger cubic boron nitride crystals.

It is another object of this invention to provide large cubic boron nitride crystals having plural enveloping layers.

Briefly described, this invention includes the growth of a complete enveloping layer or cover of cubic boron nitride on a cubic boron nitride seed crystal, and thereafter utilizing the seed crystal with its enveloping cover as a further seed crystal in a repetitive growth process, whereby a plurality of growth covers or layers are provided on the initial cubic boron nitride crystal. The growth process may be confined to a single layer on the seed crystal or the entire process may be repeated to provide cubic boron nitride crystals in the range of $\frac{1}{10}$ to $\frac{1}{2}$ carat and greater.

The invention will be better understood when taken in connection with the following description and the figure in which:

The figure is an illustration of a preferred apparatus in which this invention may be carried out.

A method of producing cubic boron nitride is disclosed in U.S. Patent 2,947,617—Wentorf. In the mentioned Wentorf patent, cubic boron nitride is prepared by subjecting ordinary hexagonal boron nitride to an elevated temperature and pressure and at least one catalyst selected from the class consisting of alkali metals, alkaline earth metals, tin, lead, antimony, and nitrides of the foregoing metals, the pressure and temperature being selected to be in the range in which the catalyst is operative to catalyze the conversion of ordinary boron nitride to cubic boron nitride.

The present invention relates to the discovery that when placing a seed crystal of cubic boron nitride in a reaction vessel and subjecting the seed to high pressure and high temperature conditions, cubic boron nitride growth is caused to occur on the seed crystal as a complete layer or covering which encloses and envelopes the entire crystal. It has also been discovered that the process could then be repeated to provide larger multiple layered cubic form of boron nitride crystals.

The invention is preferably practiced in conjunction with certain purity features. The high purity features involved in this invention are: (1) the use of the purest available hexagonal boron nitride starting material (i.e., 97–98% BN by weight) which has a sufficiently large crystal size (about 10 microns or larger) so that adsorbed foreign gases and superficial contamination are negligible, (2) the use of freshly prepared nitride catalyst material which has been protected from air and water vapor, and (3) a composite reaction vessel comprising an inner enclosure member of a high melting point metal such as, and preferably, titanium, tantalum, etc., and an outer enclosure member of a ceramic or stone-like material such as pyrophyllite. At the high temperatures of synthesis, this composite vessel minimizes the entry of impurities while the metal inner enclosure becomes chemically active and tends to combine with residual impurities in the reactants, thereby favoring improved crystal growth.

A preferred apparatus and reaction vessel employed to carry out the practices of this invention is disclosed in U.S. Patent 2,941,248, Hall, and is briefly described in relation to the single figure of this application. Referring now to the figure, apparatus 10 includes a pair of cemented tungsten carbide punches 11 and 11'. Die member 12 includes an aperture 13 in which there is positioned a reaction vessel 14. Between each punch 11 and 11' and die 12, there is included a gasket assembly 15 comprising a pair of thermally insulating and electrically nonconducting stone gaskets 16 and 17 and an intermediate metallic gasket 18.

Reaction vessel 14, in one preferred form, includes a hollow pyrophyllite cylinder 19 of approximately .930 inch length. Positioned concentrically within and adjacent cylinder 19 is a graphite electrical resistance heater tube 20, of approximately .025 inch wall thickness. Within the graphite tube 20, there is also concentrically positioned a tube 21 which is employed to contain the specimen material or mixture 22 therein. Tube 21 also includes a pair of end discs 23 and 23' on the ends of the tube to define an enclosure for the mixture 22. Discs 23 and 23' are of the same diameter as cylinder 19 and thus also contact heater tube 20 to provide an electrical connection thereto. Tube 21 together with discs 23 and 23' constitute the inner enclosure of the composite reaction vessel and accordingly are preferably of a high melting point refractory metal such as tantalum, titanium, etc. The pyrophyllite cylinder 19 constitutes the outer enclosure member of the composite reaction vessel. Adjacent each disc 23 and 23' is an end cap assembly 24 and 24' respectively, each comprising a pyrophyllite plug or disc 25 surrounded by an electrical conducting metal ring 26. Ring 26 provides an electrical connection from for example punch 11 through a disc 23 and heated tube 20.

Motion of one or both punches 11 or 11' towards each other compresses the gasket assemblies 15 and the reaction vessel to raise pressure in a reaction mixture 22 contained in tube 21. At the same time, electrical current is provided from a source (not shown) to flow through punches 11 and 11', resistance heater 20, and container tube 21 to indirectly heat and raise the temperature of the mixture 22 contained in tube 21.

Generally the minimum temperatures and pressures for spontaneous cubic form of boron nitride nucleation have been indicated to be on the order of at least about 1200° C. and 50,000 atmospheres' pressure. This pressure was based upon a calibration procedure which is related to known electrical resistance changes of various metals under known pressures, such as has been described and illustrated in the aforementioned Hall patent. More recently, the mentioned known pressures have been corrected as described in "Calibration Techniques in Ultrahigh Pressures," F. P. Bundy, Journal of Engineering for Industry, May 1961; Transactions of the ASME, Series B. Thus, what was formerly described as a pressure of 50,000 atmospheres is presently believed to be more accurately described as a pressure of about 42,000 atmospheres or about 42 kilobars. The newer, revised, pressure calibration method is used as the basis for the pressures given in the examples and claims of this application.

Temperature measurements in the practice of this invention include correlation between different measuring processes. For example, in one process, thermocouples of materials such as platinum:platinum-rhodium were utilized for direct readings. These readings were then noted to correspond to electrical heating power input to the reaction vessel in watts. In another process a metal rod such as nickel was placed in the reaction vessel and subjected to heating at a stepped series of power inputs. After each step of power input the rod was removed and examined for evidence of melting. In this way the melting point of the metal was related to the electrical power input in watts. By comparison of several different types of temperature measurement, the apparatus is suitably calibrated for a temperature versus electrical power input curve.

It is important in the practice of this invention to minimize excessive spontaneous nucleation of cubic boron nitride crystals while the layers on the seed crystal are in the process of growing, and more importantly, it is important to prevent influx into the specimen of those materials including gases and solids which deleteriously affect the reaction by spoiling or stopping growth or otherwise altering growth conditions. Accordingly, shielding means in the form of the refractory metal tube 21 and end discs 23 and 23' complete the shielding of the reaction mixture 22. Tube 21 and end discs 23, 23' may be of such refractory metals as tantalum, titanium, tungsten, zirconium or molybdenum.

In the practice of this invention, tube 21 is generally filled with a combination of cubic boron nitride crystals, hexagonal boron nitride, and a catalyst material for hexagonal boron nitride, such as lithium nitride. Lithium nitride was chosen because of its ready availability and the relative ease of boron nitride conversion associated therewith. This combination is then subjected to high pressure and high temperature conditions in the range of pressures and temperatures where the catalyst is operative so as to cause conversion of the hexagonal boron nitride to the cubic form of boron nitride. This conversion takes place on the seed crystals so that the seed crystals are increased in size as the result of an enveloping cover or layer of new cubic boron nitride growth.

Representative examples of the practice of this invention are as follows:

*Example 1*

The reaction vessel shown in the figure was employed. Titanium tube 21 contained a mixture comprising 1.0 gram of hexagonal boron nitride and 0.5 gram of lithium nitride (10 mesh) and several 100 mesh seed crystals of dark colored cubic boron nitride. The mixture was subjected to a pressure of about 45 kilobars. At the same time, temperature was increased to about 1900° C. in about 5 minutes. These conditions were then maintained constant for 15 minutes after which temperature and pressure were reduced. The seeds in the reaction vessel were found to be covered with an enveloping layer of new cubic boron nitride growth. The darker seeds could be seen (under a microscope) within the clear yellow covering growth.

*Example 2*

Example 1 was repeated with the following procedure. The pressure was 47 kilobars. The temperature was raised to about 1800° C. in 3.5 minutes. Pressure and temperature were maintained constant for 16.5 minutes. Thereafter, temperature and pressure were reduced and the cubic boron nitride seed crystals removed from the reaction vessel. The seed crystals had grown from 100 microns in their longest dimension to 200 microns. A clear yellow envelope of new growth covered the darker internal seeds.

*Example 3*

Example 1 was repeated at a pressure of about 45 kilobars. Temperature was raised to about 1800° C. in about 8 minutes. Thereafter, the pressures and temperatures were maintained constant for 8 minutes, and then the sample was cooled over a period of 7 minutes. After this period of time the pressure was reduced to ambient. After removing the seeds from the reaction vessel, it was found that these seeds had grown from about 100 microns in their longest dimension to twice their original size.

*Example 4*

Into the titanium tube 21 was placed a mixture comprising 1.4 grams of boron nitride, 0.04 gram cubic boron nitride of 60 mesh, and 0.5 gram of lithium nitride. This sample was heated for a total of 27 minutes at a constant pressure of about 49 kilobars. Of the 27 minutes, 4 minutes were utilized to reach a temperature of about 1600° C. and an additional 10 minutes to reach approximately 1700° C. These conditions were then maintained constant for about 13 minutes. Thereafter, temperatures and pressures were reduced and from the reaction vessel borazon crystals were recovered which were approximately 40 mesh. These weighed in sum about $\frac{1}{10}$ gram. About 20 seed crystals of 20 mesh (0.85 mm.) size were also recovered. Under microscopic examination the original seed crystals could be seen covered by an enveloping layer of new cubic boron nitride growth.

*Example 5*

The tube shown in the figure was filled with a mixture comprising 1.5 grams of boron nitride, 0.60 gram of lithium nitride, and 10 seed crystals of cubic boron nitride of 20 mesh (0.85 mm.) prepared as in Example 4. The sample was heated at a constant pressure of about 49 kilobars for a total of 41 minutes. Of the 41 minutes, 7 minutes were required to reach temperature of about 1600° C. Thereafter, the temperature was increased slowly for 34 minutes and the temperature reached a maximum of about 1750° C. Thereafter, temperatures and pressures were reduced and the seed crystals recovered from the reaction vessel were approximately 1.5 millimeters in their longest dimension.

*Example 6*

Into the tube shown in the figure there was placed a mixture of 0.7 gram of lithium nitride, 1 gram of hexagonal boron nitride, and a few 20 mesh (0.85 mm.) seed crystals of cubic boron nitride, prepared as in Example 4. A pressure of about 49 kilobars was established and maintained for a period of about 45 minutes. Of the period of time, 7 minutes were required to reach 1600° C. Thereafter, for the remaining 38 minutes the temperature was gradually increased to about 1750° C. Two of the seed crystals were found to have grown to 2 millimeters in their longest dimension.

*Example 7*

Example 6 was repeated utilizing 2 of the seed crystals from Example 6. These seed crystals were 2 mm. in their longest dimension. The pressure was 49 kilobars. The temperature was raised to 1550° C. in 4.5 minutes and then slowly increased to 1750° C. in 30.5 minutes. The temperature and pressure were reduced and the seeds were recovered. These seeds had additional growth and measured $2\frac{1}{3}$ mm. in their longest dimension.

*Example 8*

In the tube shown in the figure there was placed a mixture comprising 1 gram of boron nitride and 0.7 gram of lithium nitride together with 4 cubic boron nitride seed crystals of about 0.5 mm. in their longest dimension. The sample was subjected to a pressure of about 49 kilobars and heated for a total period of 19 minutes. Of the 19 minutes, 4.5 minutes were utilized in raising the temperature to 1600° C., and then the temperature was increased slowly over the remaining time to a maximum of about 1700° C. Thereafter, the temperature and pressure were reduced and the cubic boron nitride seeds were recovered from the reaction vessel. The contents of the reaction vessel indicated that fewer spontaneous cubic boron nitride crystals were formed. The seed crystals, originally of about ½ millimeter in their longest dimension, had grown to about 1 millimeter.

*Example 9*

The above example was repeated at a pressure of about 49 kilobars over a total of 19 minutes with the temperature being raised to 1600° C. in 5.5 minutes and then slowly increased for the remainder of the time to 1700° C. One of the seeds grew to 3 millimeters and the other two seeds grew to 2.75 millimeters.

*Example 10*

The tube 21 shown in the figure was titanium and contained 0.4 gram of lithium nitride, 1.7 grams of boron nitride, and several cubic boron nitride seeds of an average of 50 to 75 microns in the largest dimension. The reaction vessel of FIG. 1 was subjected to about 48 kilobars and heated to about 1900° C. for a period of 7 minutes. Thereafter, pressure was raised to about 54 kilobars in 3 minutes and held constant for a further period of 5 minutes. Thereafter, pressure and temperature were reduced and the seeds were recovered from the reaction vessel. These seeds grew to an average longest dimension of about 500 microns.

*Example 11*

Example 10 was repeated with a pressure of 48 kilobars, and the capsule was heated to about 2000° C. in a 10-minute period. Over a further period of 15 minutes, pressure was increased to 54 kilobars, held constant for 3 minutes, and then temperature and pressure were reduced, and the seeds recovered from the reaction vessel. The average dimension of these recovered crystals was about 300 microns in the largest dimension.

*Example 12*

The titanium tube 21 shown in the figure was filled with 0.4 gram lithium nitride, 1.7 grams of boron nitride, and several cubic boron nitride seeds of about 50 to 75 microns in their longest dimension. Pressure in the reaction vessel was about 48 kilobars. At this pressure, temperature was increased to about 2000° C. for a period of 7 minutes, after which the temperature was then reduced to 30° C. for a 1-minute period. Thereafter, temperature was again increased to 2000° C. for 8 minutes and then pressures and temperatures were reduced and the seeds were recovered from the reaction vessel. These seeds were covered with a new growth enveloping layer of about 100 microns thick and had a total size in the 200 to 300 micron range in the largest dimension.

*Example 13*

In the titanium tube 21 shown in the figure there was placed a powdered mixture of hexagonal boron nitride (1.6 grams) and 0.4 gram lithium nitride together with a few 80 mesh cubic boron nitride seeds. The reaction vessel was subjected to 48 kilobars' pressure with an 8-minute on 1-minute off temperature cycle starting at 2000° C. with the end temperature being about 1900° C., after a 36-minute period. After reducing the final temperature and pressure, the seed crystals were recovered from the reaction vessel and found to be of an average of 150 to 300 microns in their longer dimension.

*Example 14*

The titanium tube shown in the figure contained 0.61 gram lithium nitride, 1.5 grams boron nitride, and several cubic boron nitride seeds of about 0.3 mm. in their longest dimension. The apparatus was operated to provide pressure of 47 kilobars in the reaction vessel at a temperature of about 1900° C. for a period of time, about 75 minutes. Thereafter, temperature and pressure were reduced, and the seeds recovered from the reaction vessel were of about 0.6 to 0.7 millimeters in their larger dimension.

*Example 15*

0.6 gram lithium nitride, 1.6 grams hexagonal boron nitride and several 300 micron cubic boron nitride seeds all were mixed together in a titanium tube. At a pressure of 47 kilobars, the specimen was heated to about 1450° C. in 30 minutes. Thereafter, temperature and pressure were reduced and the seeds were recovered from the reaction vessel. It was found that most of the seeds bore a clear yellow enveloping type of growth with a size of about ¾ millimeter in largest dimension. This example was repeated several times with slight variations in pressures, temperatures, times, and mixtures with clear growth being obtained on the seeds for each operation.

As can be seen by the above examples, practice of this invention provides a cubic boron nitride crystal having a complete cover or envelope of new cubic boron nitride growth thereon. This cubic boron nitride new growth is generally smooth, clear, integral and coextensive with the seed crystal. It is firmly joined or attached to the seed crystal, and this type of new growth provides minimal interfacial irregularities or impurities. With the described crystal employed as a further seed crystal in the same process, a further envelope covering is obtained. This process is repeated until a large cubic boron nitride crystal is obtained. For example, starting with a seed crystal of about 0.005 carat, a 0.2 carat crystal has been grown in 6 repetitive operations.

Each succeeding operation must be similar to the preceding one in ranges of pressure and temperature, step practices, similarity of and cleanliness of apparatus. However, pressures and temperatures need not be maintained precisely constant over the period of reaction but may be varied as indicated in the above examples.

It has been found that both poor or good quality cubic boron nitride crystals are useful as seed crystals. It is preferred, however, for the apparatus arrangement as described, to utilize octahedral or tetrahedral configuration crystals. These mentioned crystals provide full envelopes and concentric growth layer covers with less tendency to polycrystalline layers over a wide range of conditions. The seed crystals should be arranged in the reaction vessel so that no interference is provided to coextensive growth, and growth conditions of pressure and temperature are similar for all sides or surfaces of the seed crystal. Best results are obtained when high purity materials are used as described. In this connection and in combination therewith, lower pressures and temperatures are preferred. Lower pressures and temperatures contribute to better enveloping growth, aid in the prevention of substantial spontaneous cubic boron nitride crystals elsewhere in the vessel, and prevent melting of the shield which would alter the growth process and permit impurities to enter.

The new growth takes the general form of the seed crystal so that a regular geometrical polyhedral seed crystal provides a regular geometrical polyhedral final crystal. The faces of the final crystal may then be polished if desired. Other predetermined configurations both regular and irregular may be employed as the seed crystal to provide predetermined final forms.

While a specific article and method in accordance with this invention are described, it is not intended that the invention be limited to the particular description, and it

What I claim as new and desire to secure by Letters Patent of the United States is:

1. A method of growing a large composite cubic boron nitride crystal which comprises:
    (a) placing a cubic boron nitride seed surrounded by a mixture of high purity hexagonal boron nitride and high purity catalyst selected from the class consisting of alkali metals, alkaline earth metals, lead, antimony, tin and nitrides of the foregoing metals in a metallic shield means,
    (b) simultaneously subjecting these materials to pressure in the range of from about 40 to about 60 kilobars and to temperature in the range of from about 1400° C. to about 2100° C., and
    (c) reducing the temperature and pressure and recovering a cubic boron nitride crystal consisting essentially of the cubic boron nitride seed completely enveloped by an aftergrown layer of cubic boron nitride distinguishable from said seed and securely bonded thereto.

2. A method of growing a large composite cubic boron nitride crystal which comprises:
    (a) placing a cubic boron nitride seed surrounded by a mixture of high purity hexagonal boron nitride and high purity catalyst selected from the class consisting of alkali metals, alkaline earth metals, lead, antimony, tin and nitrides of the foregoing metals in a metallic shield means,
    (b) simultaneously subjecting these materials to pressure in the range of from about 40 to about 60 kilobars and to temperature in the range of from about 1400° C. to about 2100° C.,
    (c) reducing the temperature and pressure and recovering a cubic boron nitride crystal consisting essentially of the cubic boron nitride seed completely enveloped by an aftergrown layer of cubic boron nitride distinguishable from said seed and securely bonded thereto, and
    (d) repeating the aforementioned process steps on the recovered crystal to grow a plurality of bonded layers of cubic boron nitride on said seed to form a unified composite crystal.

3. As an article of manufacture, a composite cubic boron nitride crystal consisting essentially of a preformed cubic boron nitride crystal core and at least one aftergrown layer of cubic boron nitride distinguishable from said core, completely enveloping said core and securely bonded thereto.

4. A composite cubic boron nitride crystal substantially as recited in claim 3 wherein the aftergrowth differs in color from the crystal core.

5. The method substantially as recited in claim 1 wherein the catalyst is lithium nitride, the shielding means is made of titanium, the pressure employed is about 50 kilobars and the temperature employed is about 1800° C. whereby spontaneous nucleation of cubic boron nitride crystals is substantially avoided.

References Cited by the Examiner

UNITED STATES PATENTS 2,544,414 3/51 Bridgman et al.
2,947,617 8/60 Wentorf _____ 23—191 X

FOREIGN PATENTS 860,499 2/61 Great Britain.

MAURICE A. BRINDISI, *Primary Examiner.*